(12) United States Patent
Tanimura et al.

(10) Patent No.: US 7,391,542 B2
(45) Date of Patent: Jun. 24, 2008

(54) OPTICAL SCANNING APPARATUS, AND IMAGE FORMING APPARATUS USING THE SAME

(75) Inventors: Ken Tanimura, Tochigi (JP); Hidekazu Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1004 days.

(21) Appl. No.: 10/851,158

(22) Filed: May 24, 2004

(65) Prior Publication Data

US 2004/0239999 A1 Dec. 2, 2004

(30) Foreign Application Priority Data

May 27, 2003 (JP) ............... 2003-149521

(51) Int. Cl.
*H04N 1/04* (2006.01)
(52) U.S. Cl. .................. 358/481; 358/480; 358/474; 358/475
(58) Field of Classification Search ........... 358/481, 358/480, 474, 475, 482, 494; 359/204, 205, 359/206, 207
See application file for complete search history.

(56) References Cited

U.S. PATENT DOCUMENTS

| | | | | |
|---|---|---|---|---|
| 5,054,866 A | * | 10/1991 | Tomita et al. ............... | 359/201 |
| 5,245,462 A | | 9/1993 | Kanai et al. ................. | 359/204 |
| 5,701,190 A | * | 12/1997 | Mochizuki et al. .......... | 359/205 |
| 6,141,118 A | * | 10/2000 | Yamawaki et al. .......... | 358/481 |
| 7,023,595 B2 | * | 4/2006 | Takakubo ................... | 359/204 |
| 2002/0126362 A1 | | 9/2002 | Shimomura ................. | 359/196 |

* cited by examiner

*Primary Examiner*—Houshang Safaipour
(74) *Attorney, Agent, or Firm*—Fitzpatrick, Cella, Harper & Scinto (57) ABSTRACT

Disclosed in an optical scanning apparatus which includes a deflecting unit comprised of a rotary polygon mirror for deflecting a light beam radiated from a light source unit, and a scanning optical system for guiding the light beam deflected by the deflecting unit to a surface to be scanned. In the optical scanning apparatus, individual elements are set such that a diameter of a circumscribed circle of the rotary polygon mirror, the number of deflecting facets of the rotary polygon mirror, an incident angle of the light beam on the deflecting facet at the time when the light beam scans a scanning center, a maximum swing angle of the deflecting facet at the time when an effective scanning range is scanned, and a magnification of the scanning optical system in a sub scanning section can satisfy a predetermined condition, thereby reducing an unevenness of pitches due to a deflecting-facet fall of the rotary polygon mirror, and readily achieving a highly precise and fine image.

18 Claims, 11 Drawing Sheets

FIG. 10

OPTICAL SCANNING APPARATUS, AND IMAGE FORMING APPARATUS USING THE SAME

BACKGROUND OF THE INVENTION

1. Field of the Invention

The present invention relates to an optical scanning apparatus and an image forming apparatus using the optical scanning apparatus, and particularly to an optical scanning apparatus which is suitably applicable to laser beam printers (LBPs), digital copying machines, multi-function printers and the like that employ an electrophotographic process, and in which an optically-modulated light beam from a light source unit is reflectively deflected by a rotary polygon mirror serving as a deflecting unit, transmitted through a scanning optical system, and scanned on a surface to be scanned (a scanned surface) to record image information at a high speed. The present invention further relates to a color image forming apparatus which uses a plurality of optical scanning apparatuses, and includes a plurality of image bearing members corresponding to respective colors.

2. Related Background Art

In a conventional optical scanning apparatus, such as a laser beam printer, image recording is carried out as follows. A light source unit emits a light beam optically modulated in accordance with an image signal, an optical deflector, such as a rotary polygon mirror, periodically deflects the light beam, an fθ lens system having fθ characteristics converges the light beam and forms a light spot on a surface of a photosensitive recording material (a photosensitive drum), and the surface of the recording material is optically scanned.

Figure 10:
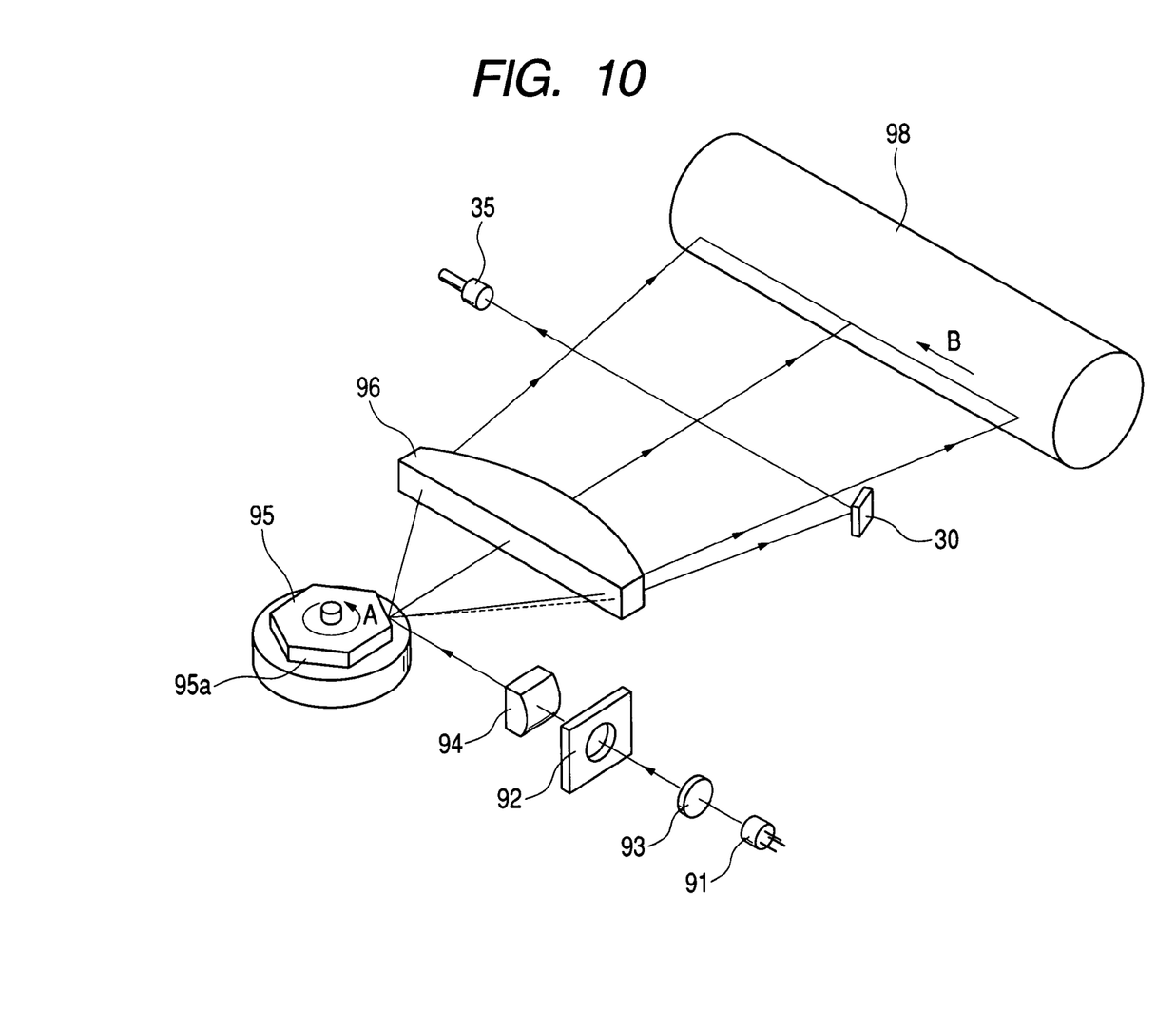
FIG. 10 is a schematic view illustrating a main portion of a conventional optical scanning apparatus.

FIG. 10 schematically illustrates a main portion of a conventional optical scanning apparatus. In FIG. 10, a divergent light beam emitted from a light source unit 91 is converted into an approximately parallel light beam or a convergent light beam by a collimator lens 93, the light beam (the amount of light) is shaped by an aperture stop 92, and the light beam is incident on a cylindrical lens 94 having refractive power only in a sub scanning direction. The light beam incident on the cylindrical lens 94 emerges therefrom without any change in a main scanning section. With respect to a sub scanning section, the light beam is converged by the cylindrical lens 94, and is imaged on a place near a deflecting facet (a reflective facet) 95a of an optical deflector 95, which is comprised of a rotary polygon mirror, as an approximately linear image.

The light beam reflectively deflected by the deflecting facet 95a of the optical deflector 95 is guided onto a photosensitive drum surface serving as a scanned surface 98 through a scanning optical system (an fθ lens system) 96 having fθ characteristics. The photosensitive drum surface 98 is scanned with an imaged spot moving in a direction of an arrow B (a main scanning direction) when the optical deflector 95 is rotated in a direction of an arrow A. Image information is thus recorded.

In the above-discussed optical scanning apparatus, a BD (beam detector) sensor 35 serving as an optical detector is provided such that a start timing of image formation on the photosensitive drum surface 98 can be adjusted prior to the scanning of the photosensitive drum surface 98 with the light spot. The BD sensor 35 receives a BD light beam which is a portion of the light beam reflectively deflected by the optical deflector 95, i.e., a light beam scanning a range outside an image forming range prior to the scanning of the image forming range on the photosensitive drum surface 98. The BD light beam is reflected by a BD mirror 30, and is condensed by a BD lens (not shown) to be incident on the BD sensor 35. A BD signal (a synchronous signal) is detected from an output signal of the BD sensor 35. The start timing of image recording on the photosensitive drum surface 98 is adjusted based on the BD signal.

The scanning optical system 96 in FIG. 10 is constructed such that a conjugate relationship between the deflecting facet 95a of the optical deflector 95 and the photosensitive drum surface 98 can be established in the sub scanning section. A so-called deflecting-facet fall or inclination of the optical deflector 95 is thus compensated for.

In such an optical scanning apparatus, higher printing precision is desired in recent years, so that it is preferable to decrease unevenness of pitches between scanning lines as far as possible. Even when the scanning optical system has a function of compensating for the fall of the deflecting facet of the rotary polygon mirror, the unevenness of pitches due to the deflecting-facet fall of the rotary polygon mirror is likely to occur since positions of the light beam incident on the rotary polygon mirror differ from each other between respective scanning positions (see U.S. Pat. No. 5,245,462, and US AA2002126362).

The unevenness of pitches dz due to the deflecting-facet fall of the rotary polygon mirror is written as $$dz = \Delta \times \beta \times \gamma$$

where $\gamma$ is the amount of the deflecting-facet fall of the rotary polygon mirror, $\beta$ is a magnification (a sub scanning magnification) of the scanning optical system in the sub-scanning section, and $\Delta$ is an optical path difference of the light beam incident on the rotary polygon mirror.

When the scanning optical system is to be made compact, the sub scanning magnification $\beta$ increases since the scanning lens comes closer to the rotary polygon mirror. The amount of the deflecting-facet fall $\gamma$ must be accordingly decreased, so that the standard of the deflecting-facet fall of the rotary polygon mirror inevitably becomes stringent.

In connection with the scanning lens, a resin mold is widely used recently, and its cost is increasingly reduced. On the other hand, the rotary polygon mirror needs to be formed of a metal material for the purposes of prevention of its deformation accompanying its rotation movement. Therefore, a ratio of the cost of the rotary polygon mirror relative to the cost of the overall scanning optical system is large.

Accordingly, as the standard of the deflecting-facet fall becomes more stringent, it becomes more difficult to reduce the cost of the rotary polygon mirror. As its solving measures, the optical path difference $\Delta$ can be decreased by reducing the size of the rotary polygon mirror. As the size of the rotary polygon mirror is reduced, the standard of the deflecting-facet fall becomes tolerant and the rotary polygon mirror can be made compact. Thus, a great reduction of the cost can be expected.

However, when the size of the rotary polygon mirror is reduced, the deflecting facet is decreased, and hence the width of a light beam passing through the scanning optical system inevitably decreases. Generally, the diameter of a spot imaged on the photosensitive drum surface can be written as $$\text{(spot diameter)} = a \times \lambda \times (F\text{-number}) \tag{A}$$

where a is a proportional constant (about 1.64), $\lambda$ is a wavelength (mm) of a light beam radiated from the light source unit, and (F-number) is an exit F-number (Fno) of the scanning optical system.

As discussed above, when the size of the rotary polygon mirror is reduced, the width of the light beam passing through the scanning optical system decreases. Accordingly, the F-number increases, and the spot diameter increases as can be understood from the relation (A). It is hence difficult to obtain a highly precise and fine image.

SUMMARY OF THE INVENTION

It is an object of the present invention to provide an optical scanning apparatus, and an image forming apparatus using the optical scanning apparatus, which are capable of reducing unevenness of pitches due to the deflecting-facet fall of a rotary polygon mirror, and capable of readily obtaining a highly precise and fine image.

According to one aspect of the invention, an optical scanning apparatus comprises a deflecting unit comprised of a rotary polygon mirror for deflecting a light beam emitted from a light source unit; and a scanning optical system for guiding the light beam deflected by the deflecting unit to a surface to be scanned;

wherein a condition written as $$D\beta[\cos(\pi/M-|\theta|)-\sin(\pi/M-|\theta|)\tan|\theta|-\cos(\pi/M)]/\cos(\alpha/2) \leq 1.7 \text{ (mm)}$$

where D (mm) is a diameter of a circumscribed circle of the rotary polygon mirror, M is the number of deflecting facets of the rotary polygon mirror, $\alpha$ (rad) is an incident angle of the light beam on the deflecting facet at the time when the light beam scans a scanning center, $\theta$ (rad) is a maximum swing angle of the deflecting facet at the time when an effective scanning range is scanned, and $\beta$ is a magnification of the scanning optical system in a sub scanning section.

According to further aspect of the invention, in the optical scanning apparatus, where $\lambda$ (mm) is a wavelength of the light beam radiated from the light source unit, f (mm) is a focal length of the scanning optical system in a main scanning section, and f' (mm) is a focal length of a converting optical element for converting the light beam radiated from the light source unit into another light beam, an F-number of the converting optical element is equal to or larger than five (5), and a condition of $\lambda \cdot (f/f') \leq 8.1 \times 10^{-3}$ (mm) is satisfied.

According to another aspect of the invention, an optical scanning apparatus comprises a deflecting unit comprised of a rotary polygon mirror for deflecting a light beam radiated from a light source unit; and a scanning optical system for guiding the light beam deflected by the deflecting unit to a surface to be scanned;

wherein a width of the light beam incident on a deflecting facet of the deflecting unit is adapted to be larger than a width of the deflecting facet in a main scanning section, and a condition written as $$D\beta[\cos(\pi/M|\theta|)-\sin(\pi/M|\theta|)\tan|\theta|-\cos(\pi/M)]/\cos(\alpha/2) \leq 0.9 \text{ (mm)}$$

where D (mm) is a diameter of a circumscribed circle of the rotary polygon mirror, M is the number of deflecting facets of the rotary polygon mirror, $\alpha$ (rad) is an incident angle of the light beam on the deflecting facet at the time when the light beam scans a scanning center, $\theta$ (rad) is a maximum swing angle of the deflecting facet at the time when an effective scanning range is scanned, and $\beta$ is a magnification of the scanning optical system in a sub scanning section.

According to further aspect of the invention in the optical scanning apparatus, wherein a condition of $D/(\lambda f) \cdot \sin(\pi/M) \leq 20.5$ (1/mm) is satisfied where $\lambda$ (mm) is a wavelength of the light beam radiated from the light source unit, and f (mm) is a focal length of the scanning optical system in a main scanning section.

According to further aspect of the invention, the optical scanning apparatus further comprises a driving unit for rotatably driving the rotary polygon mirror, and a bearing portion for rotatably supporting the rotary polygon mirror, and wherein the rotary polygon mirror is comprised of a plurality of deflecting facets which are formed directly on an outer surface of a bearing member constituting a rotational portion of the bearing portion.

According to further aspect of the invention, the optical scanning apparatus further comprises a driving unit for rotatably driving the rotary polygon mirror, and a bearing portion for rotatably supporting the rotary polygon mirror, and wherein the rotary polygon mirror is comprised of a plurality of deflecting facets which are formed directly on an outer surface of a sleeve member constituting a rotational portion of the bearing portion.

According to further aspect of the invention in the optical scanning apparatus, the scanning optical system is a deflecting-facet fall compensation optical system.

According to further aspect of the invention in the optical scanning apparatus, a wavelength of the light beam radiated from the light source unit is equal to or less than 500 nm.

According to further aspect of the invention in the optical scanning apparatus, the light source unit includes a plurality of light emitting portions.

According to another aspect of the invention, an image forming apparatus comprises an optical scanning apparatus set out in the foregoing;

a photosensitive member placed at the surface to be scanned;

a developing device for developing an electrostatic latent image, which is formed on the photosensitive member by the light beam scanned by the optical scanning apparatus, as a toner image;

a transferring device for transferring the developed toner image onto a transferring material; and a fixing device for fixing the transferred toner image on the transferring material.

According to another aspect of the invention, an image forming apparatus comprises an optical scanning apparatus set out above; and a printer controller for converting code data input from an external device into an image signal to supply the image signal to the optical scanning apparatus.

According to another aspect of the invention, a color image forming apparatus comprises a plurality of optical scanning apparatuses set out in the foregoing; and a plurality of image bearing members each of which is placed at the surface to be scanned of the each optical scanning apparatus, and which form images of different colors, respectively.

According to further aspect of the invention, the color image forming apparatus further comprises a printer controller for converting color signals input from an external device into image data of different colors to supply the image data to the optical scanning apparatuses, respectively.

These and further aspects and features of the invention will become apparent from the following detailed description of preferred embodiments thereof in conjunction with the accompanying drawings.

DESCRIPTION OF THE PREFERRED EMBODIMENTS

First Embodiment

Figure 1A:
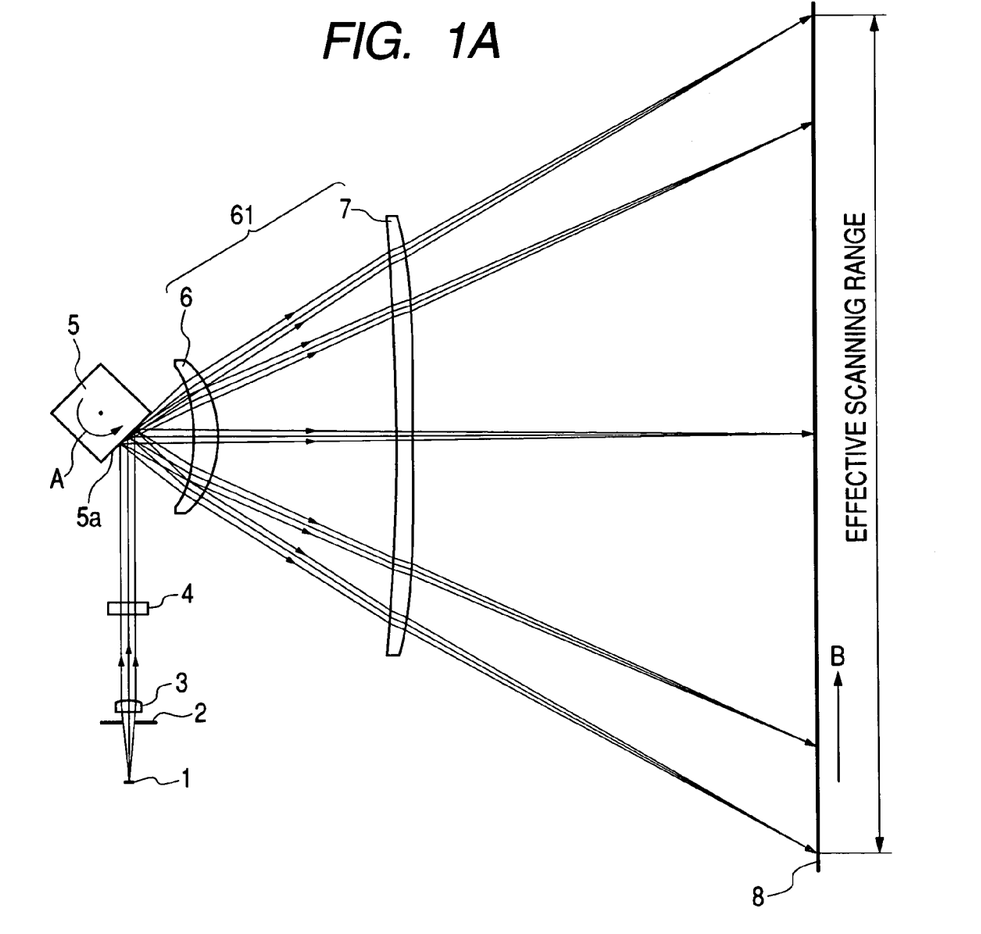
FIG. 1A is a cross-sectional view taken along a main scanning section illustrating a first embodiment according to the present invention.
Figure 1B:
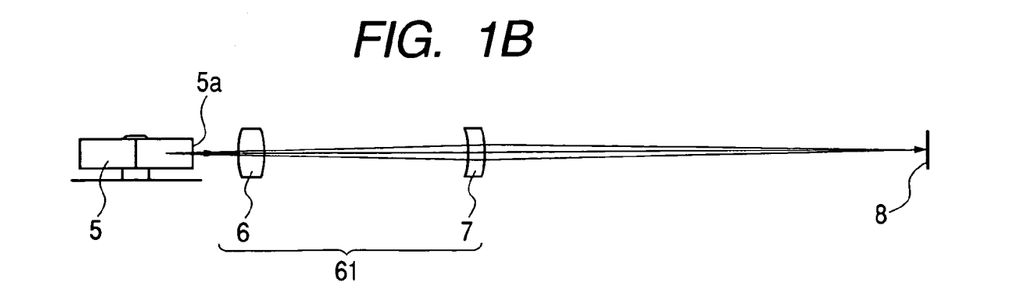
FIG. 1B is a cross-sectional view taken along a sub scanning section illustrating the first embodiment according to the present invention.

FIG. 1A is a cross-sectional view in a main scanning direction illustrating a main portion of an optical scanning apparatus of a first embodiment according to the present invention. FIG. 1B is a cross-sectional view in a sub scanning section illustrating the first embodiment.

In this specification, the main scanning direction means a direction perpendicular to a rotational axis of a deflecting unit and an optical axis of a scanning optical system (i.e., a direction along which a light beam is reflectively deflected (deflection-scanned) by the deflecting unit), and the sub scanning direction means a direction parallel to the rotational axis of the deflecting unit. Further, the main scanning section means a plane parallel to the main scanning direction and including the optical axis of the scanning optical system. The sub scanning section means a plane perpendicular to the main scanning section.

In FIG. 1A, reference numeral 1 represents a light source unit which is comprised of, for example, a semiconductor laser (a short-wavelength laser) emitting a light beam at a wavelength λ equal to or less than 500 nm (in this embodiment, 405 nm).

Reference numeral 2 represents an aperture stop for restricting a passing light beam to shape the light beam. Reference numeral 3 represents a converting optical element (a collimator lens) for converting the light beam emitted from the light source unit 1 into a nearly parallel light beam (or a nearly convergent light beam, or a nearly divergent light beam).

Reference numeral 4 represents a lens system (a cylindrical lens) having a predetermined refractive power only in the sub scanning direction such that the light beam transmitted through the converting optical element 3 can be imaged on a deflecting facet (a reflective facet) 5a of an optical deflector 5 (described later) as an approximately linear image in the sub scanning section.

Elements of the aperture stop 2, the converting optical element 3, the cylindrical lens 4 and the like constitute a portion of an incident optical system.

Reference numeral 5 represents an optical deflector serving as a deflecting unit, which is comprised of, for example, a rotary polygon mirror with four deflecting facets. The optical deflector 5 is rotated at a uniform speed in a direction of an arrow A by a driving unit (not shown) such as a motor.

Reference numeral 61 represents a scanning optical system (an fθ lens system) having a light condensing function and fθ characteristics, which consists of first and second fθ lenses formed of a plastic material. The scanning optical system 61 forms an image of the light beam based on image information and reflectively deflected by the optical deflector 5 on a photosensitive drum surface 8 serving as a scanned surface. The scanning optical system 61 further establishes a conjugate relationship between the deflecting facet 5a of the optical deflector 5 and the photosensitive drum surface 8 in the sub scanning section, thereby achieving a function of compensating for the fall of the deflection facet 5a (a deflecting-facet fall compensation optical system).

Reference numeral 8 represents the surface of the photosensitive drum, which is a surface to be scanned.

In the first embodiment, the amount of a light beam emitted from the semiconductor laser 1 is restricted by the aperture stop 2, and the light beam is converted into a nearly parallel light beam by the collimator lens 3, and incident on the cylindrical lens 4. The nearly parallel light beam incident on the cylindrical lens 4 emerges therefrom without any change in the main scanning section. In the sub scanning section, the light beam is converged by the cylindrical lens 4, and is imaged on a place near the deflecting facet 5a of the optical deflector 5 as an approximately linear image (a linear image extending in the main scanning direction). Here, in the main scanning section, the width of the nearly parallel light beam incident on the deflecting facet 5a is set smaller than a facet width of the deflecting facet 5a of the optical deflector 5 (an under-field system).

The light beam reflectively deflected by the deflecting facet 5a of the optical deflector 5 is imaged on the photosensitive drum surface 8 in the form of a spot by the first and second fθ lenses 6 and 7. The photosensitive drum surface 8 is scanned with the imaged spot moving at a uniform speed in a direction of an arrow B (the main scanning direction) when the optical deflector 5 is rotated in a direction of an arrow A. Image recording is thus executed on the photosensitive drum surface 8 serving as a recording material.

Figure 3:
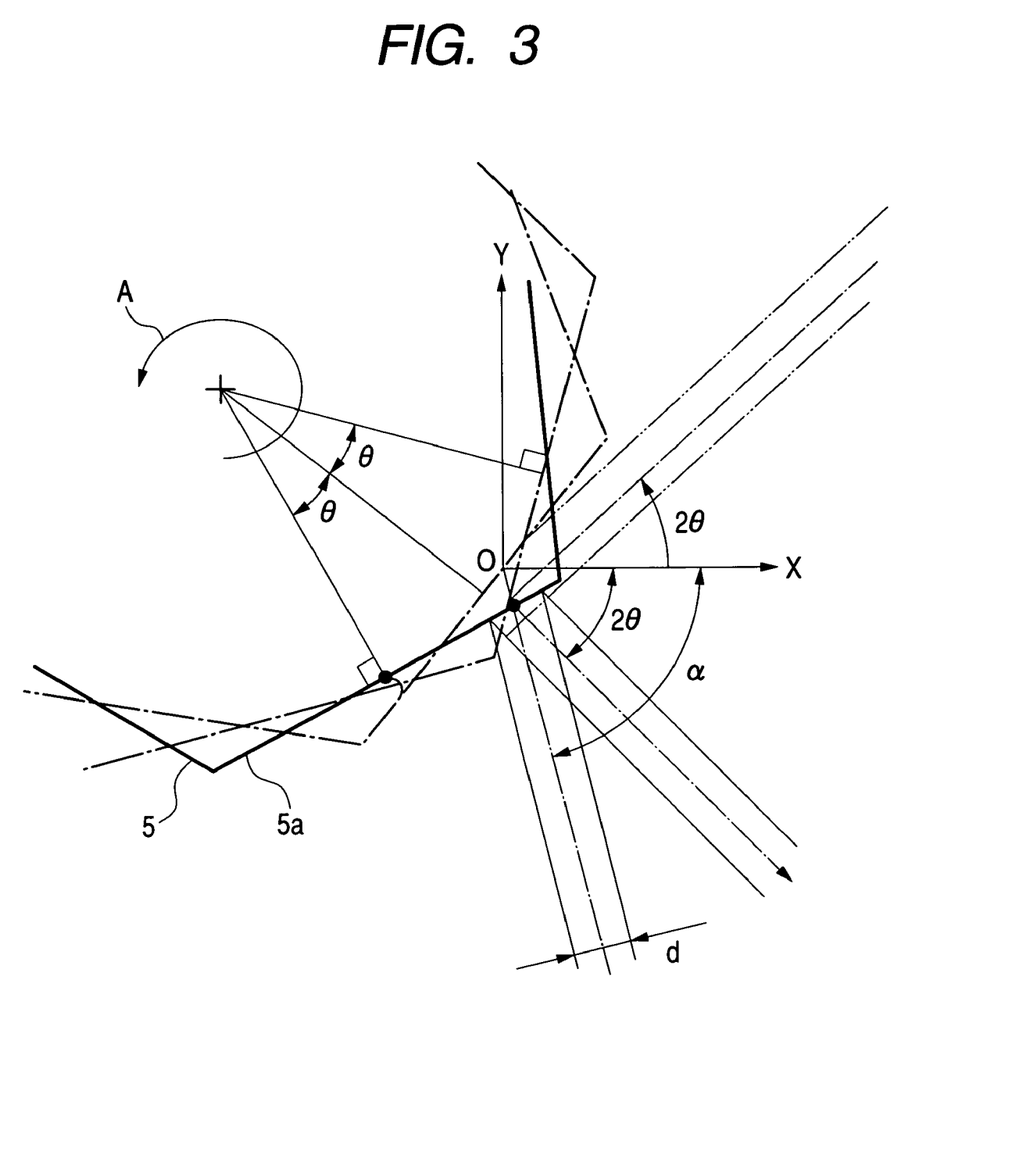
FIG. 3 is a view illustrating a concept of a width of a light beam in the first embodiment according to the present invention.

In the first embodiment, where D (mm) is a diameter of a circumscribed circle of the rotary polygon mirror, M is the number of deflecting facets of the rotary polygon mirror, α (rad) is an incident angle of the light beam incident on the deflecting facet at the time when the light beam scans a scanning center, and θ (rad) is a maximum swing angle of the deflecting facet at the time when an effective scanning range is scanned, an optical path difference of the light beam incident on the rotary polygon mirror (an optical path difference occurring during rotation of the rotary polygon mirror) Δ can be written as (see FIG. 3)

$$\Delta = D[\cos(\pi/M - |\theta|) - \sin(\pi/M - |\theta|)\tan|\theta| - \cos(\pi/M)]/\cos(\alpha/2) \quad (a)$$

In the event that the deflecting-facet fall of γ (rad) occurs in the optical deflector, where β is a magnification (a sub scanning magnification) of the scanning optical system in the sub scanning section, the unevenness of pitches dz in the sub scanning direction due to the deflecting-facet fall can be written as $$dz = D\beta\gamma[\cos(\pi/M - |\theta|) - \sin(\pi/M - |\theta|)\tan|\theta| - \cos(\pi/M)]/\cos(\alpha/2) \quad (b)$$

In order to reduce the unevenness of pitches to a value equal to or less than one (1) micron, the deflecting-facet fall of the optical deflector needs to be equal to or less than 1' in current scanning optical systems. This standard is very stringent one when fabrication variations are considered. It is accordingly difficult to reduce the fabrication cost.

In the first embodiment, therefore, individual elements are set such that the size of the rotary polygon mirror can satisfy the following condition (1), as a result of which the standard of the deflecting-facet fall needed to achieve the unevenness of pitches equal to or less than one (1) micron can be tolerated up to 2'.

$$D\beta[\cos(\pi/M-|\theta|)-\sin(\pi/M-|\theta|)\tan|\theta|-\cos(\pi/M)]/\cos(\alpha/2) \leq 1.7 \text{ (mm)} \quad (1)$$

Thus, in the first embodiment, the fabrication yield is improved and the cost is reduced.

Further, when the rotary polygon mirror is made small, it is possible to reduce the load imposed on a driving mechanism for rotating the rotary the rotary polygon mirror, and further increase its rotation speed. The printing speed can be hence increased.

In the above condition (1), it is preferable to set the sub scanning magnification $\beta$ equal to or more than one (1). As the sub scanning magnification $\beta$ increases, the scanning lens comes closer to the rotary polygon mirror and a scanner box can be accordingly made compact. Further, the length of the lens can be shortened, so that the fabrication cost of the lens can be reduced.

Further, in the first embodiment, individual elements are set such that an F-number (Fno) of the collimator lens is equal to or larger than five (5), and a condition of $$\lambda \cdot (f/f') \leq 8.1 \times 10^{-3} \text{ (mm)} \quad (2)$$

is satisfied where $\lambda$ (mm) is the wavelength of the light beam radiated from the semiconductor laser, f (mm) is the focal length of the scanning optical system in the main scanning section, and f' (mm) is the focal length of the collimator lens. When the size of the rotary polygon mirror decreases, the width of a light beam incident on the deflecting facet of the rotary polygon mirror decreases, and accordingly the size of a spot excessively increases unless the condition (2) is satisfied. It is hence impossible to achieve a highly precise and fine printing.

Furthermore, it is preferable to set the focal length f' of the collimator lens such that the following condition (3) can be satisfied.

$$f \leq 20.3 \times f' \text{ (mm)} \quad (3)$$

Further, the laser light beam is likely to be too largely widened unless Fno of the collimator lens is equal to or more than five (5) as discussed above, and hence spherical aberrations due to the collimator lens remain. Resultantly, the spot on the scanned surface gets out of shape in the main scanning direction, so that it is likely to cause printing degradation.

Figure 2:
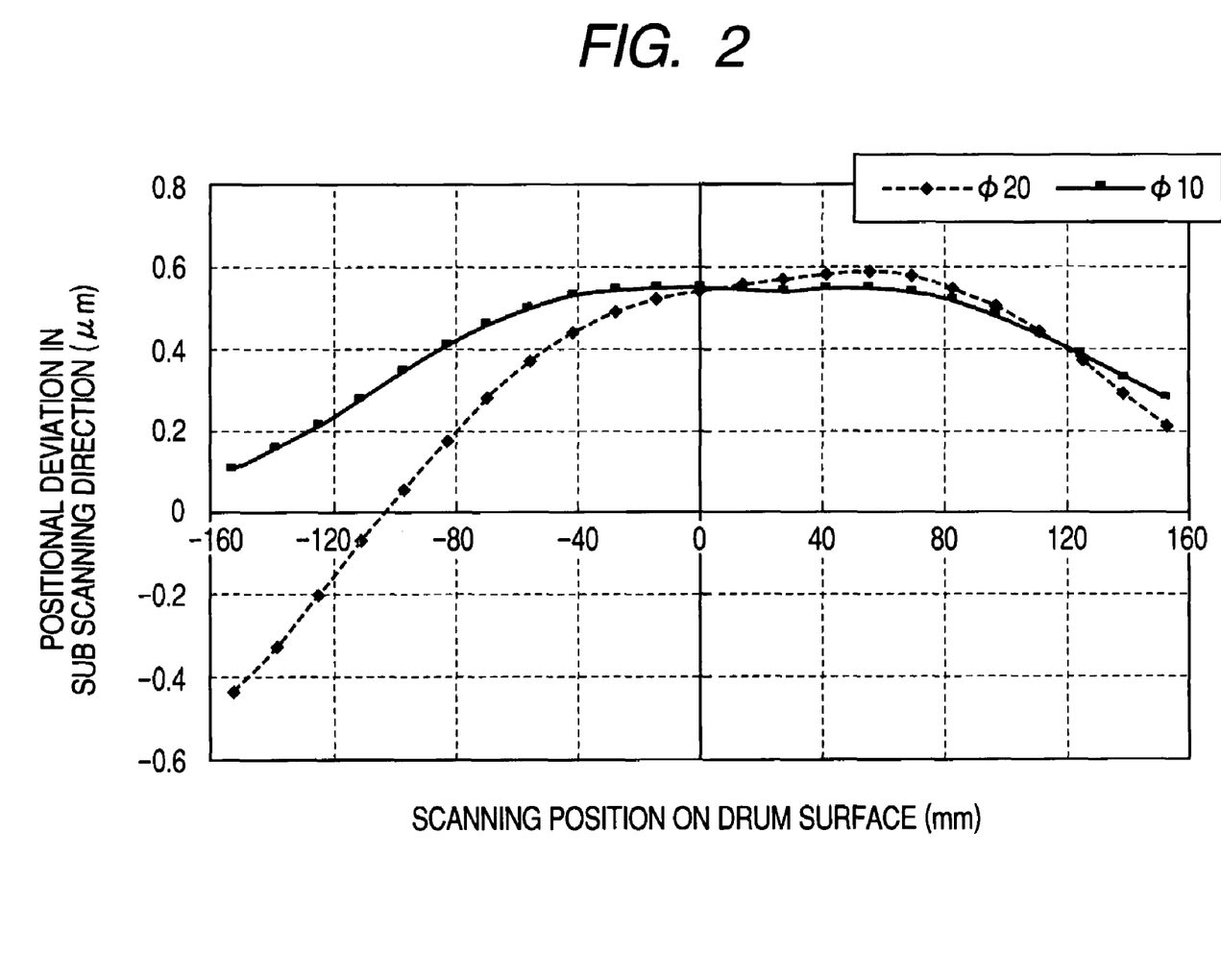
FIG. 2 is a graphical view showing unevenness of pitches (a positional deviation in a sub scanning direction) due to the deflecting-facet fall of a rotary polygon mirror of the first embodiment.
Figure 4A:
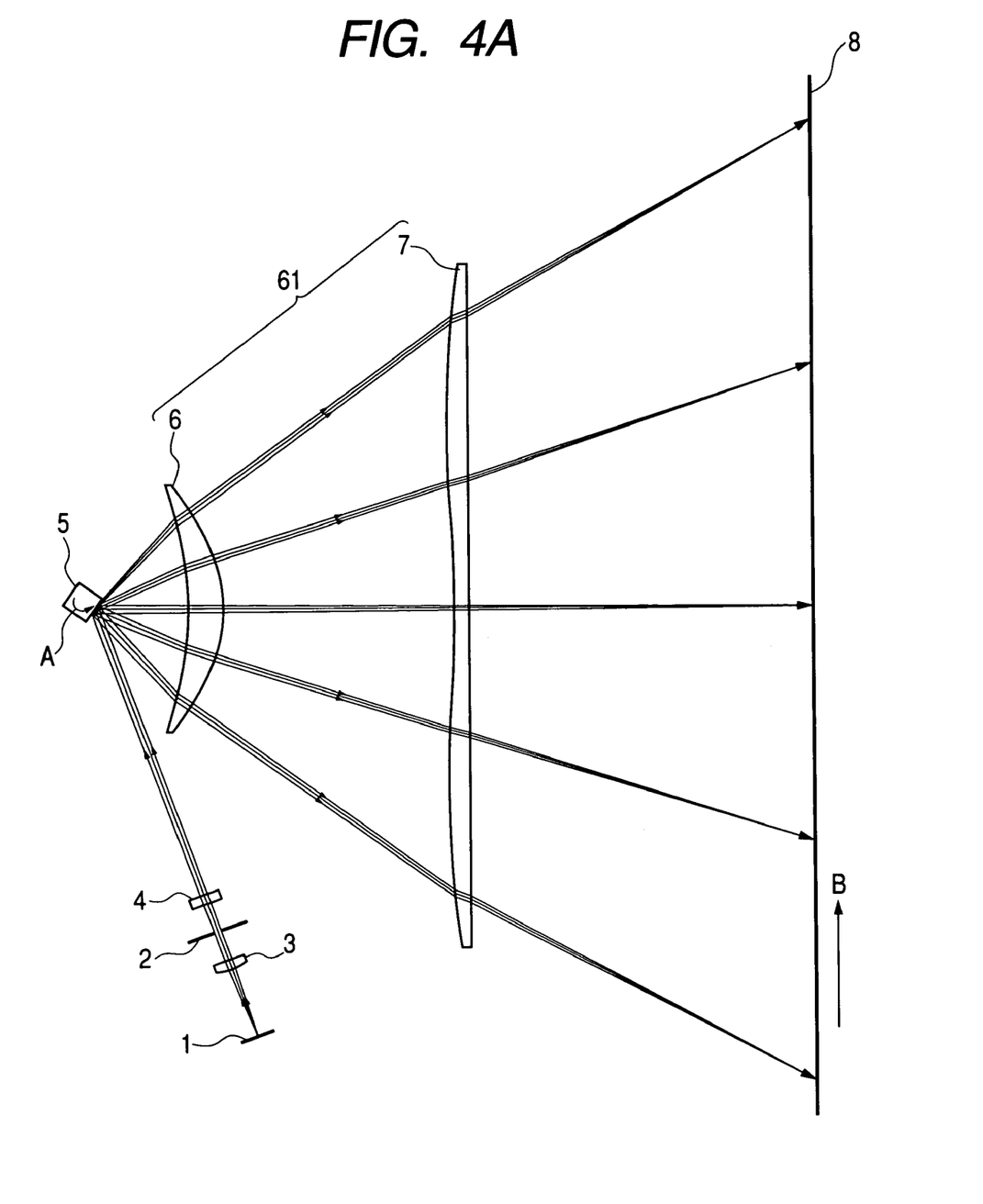
FIG. 4A is a cross-sectional view taken along a main scanning section illustrating the first embodiment.
Figure 4B:
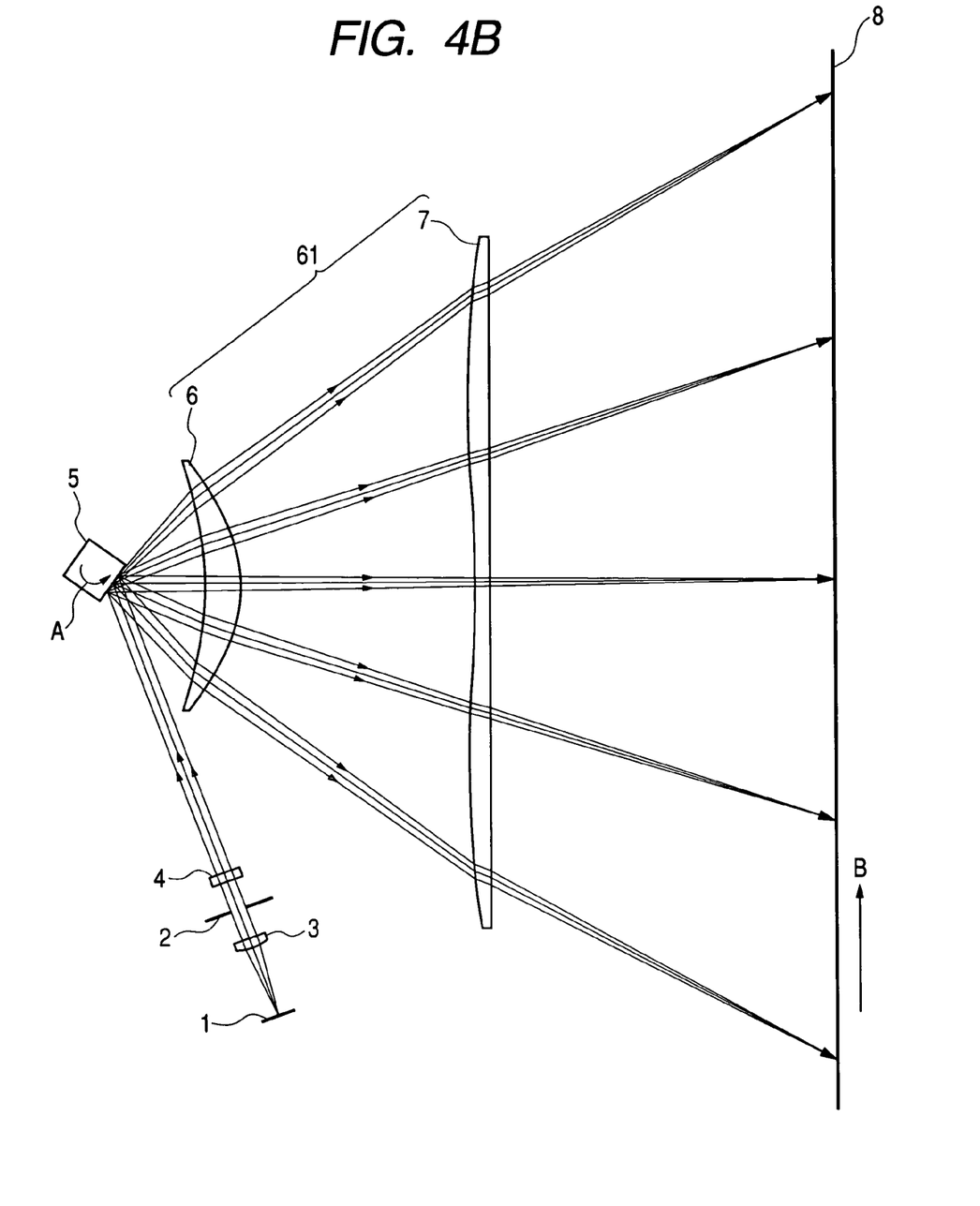
FIG. 4B is a cross-sectional view taken along a main scanning section illustrating the first embodiment.

As a numerical example, an optical scanning apparatus is used, in which the focal length f of a scanning optical system in the main scanning section is 189 mm. A rotary polygon mirror is used, which has four deflecting facets and whose circumscribed circle has a diameter of 20 mm as illustrated in FIG. 4B. In the event that the light source unit is an infrared laser (its wavelength is 780 nm), the diameter of a spot on the photosensitive drum surface is 65 microns. When the deflecting facet of the rotary polygon mirror falls by 1', the unevenness of pitches of one (1) micron occurs as shown by a dotted line in FIG. 2. Here, when the number of deflecting facets of the rotary polygon mirror remains the same and the diameter of the circumscribed circle is reduced to ten (10) mm as illustrated in FIG. 4A, the unevenness of pitches at the time of the deflecting-facet fall of 1' is reduced to 0.4 micron as shown by a solid line in FIG. 2.

In the event that the light source unit is a infrared laser (its wavelength is 780 nm) and the diameter of the circumscribed circle of the rotary polygon mirror is ten (10) mm, the diameter of a spot on the photosensitive drum surface excessively increases to 125 microns if the width of an incident light beam is set such that the light beam cannot be eclipsed by the deflecting facet of the rotary polygon mirror. This value is unsuitable for a highly precise and fine printing. In contrast thereto, where the light source unit is replaced by a short-wavelength laser (its wavelength is 405 nm), the diameter of a spot on the photosensitive drum surface decreases to 65 microns. This value makes it possible to achieve a highly precise and fine printing.

In the first embodiment, the sub scanning magnification $\beta$ of the scanning optical system is set to 2.0. Further, as illustrated in FIG. 3, the angle a between the optical axis of a light beam incident oh the deflecting facet and the optical axis of the scanning optical system in the main scanning section is set to 70 degrees, and the maximum swing angle $\theta$ of the deflecting facet at the time when the effective scanning range is scanned is set to 24 degrees. When the left side of the condition (1) is calculated using those values of the respective parameters, its calculated value is 1.63 (mm) which satisfies the condition (1).

Further, the collimator lens with the focal length f' of 20 mm is used in the first embodiment. When the F-number of the collimator lens is calculated from the width of the light beam incident on the deflecting facet in the main scanning direction, its calculated value is 10.0. When the left side $(\lambda \cdot (f/f'))$ of the condition (2) is calculated using those values of the respective parameters, its calculated value is $3.8 \times 10^{-3}$ (mm) which satisfies the condition (2).

In the first embodiment, a precise and fine scanning can be achieved by using a short-wavelength light source unit and an appropriate deflecting unit as discussed above. Further, the cost can be reduced due to the downsizing of the deflecting unit.

Furthermore, in the first embodiment, there are provided a driving unit (a motor) for rotatably driving the rotary polygon mirror, and a bearing portion for rotatably supporting the rotary polygon mirror, and the rotary polygon mirror is comprised of a plurality of deflecting facets which are formed directly on an outer surface of a shaft member (or a sleeve member) constituting a rotary portion of the bearing portion.

Figure 5A:
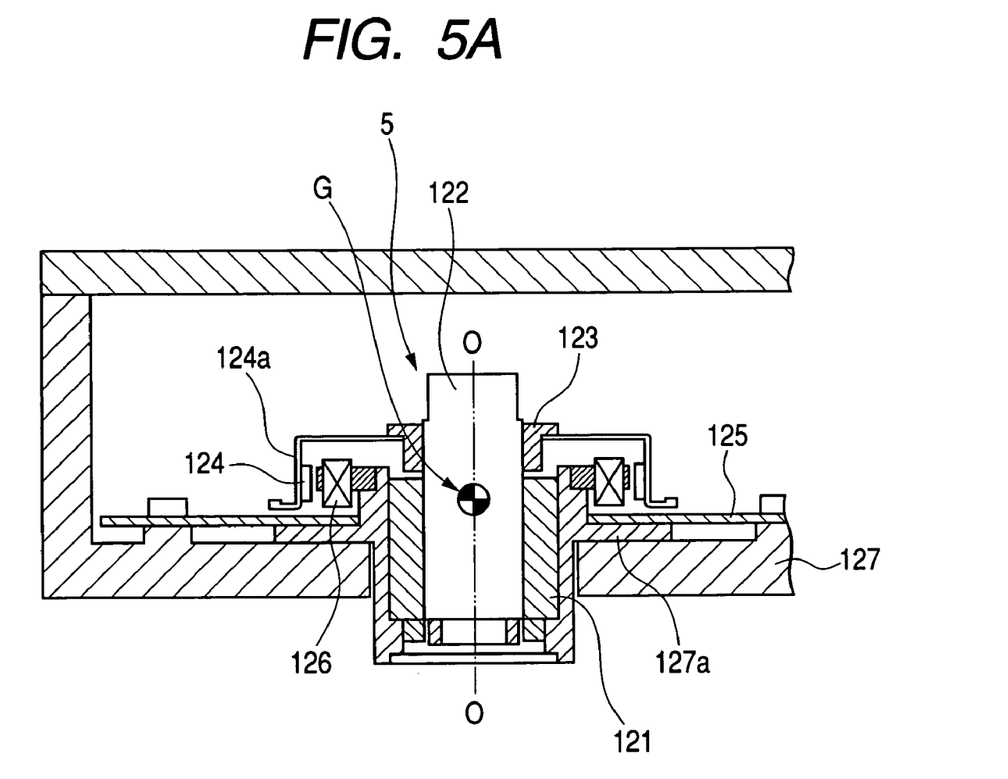
FIG. 5A is a cross-sectional view illustrating a main portion in the vicinity of a rotary polygon mirror in the first embodiment.
Figure 5B:
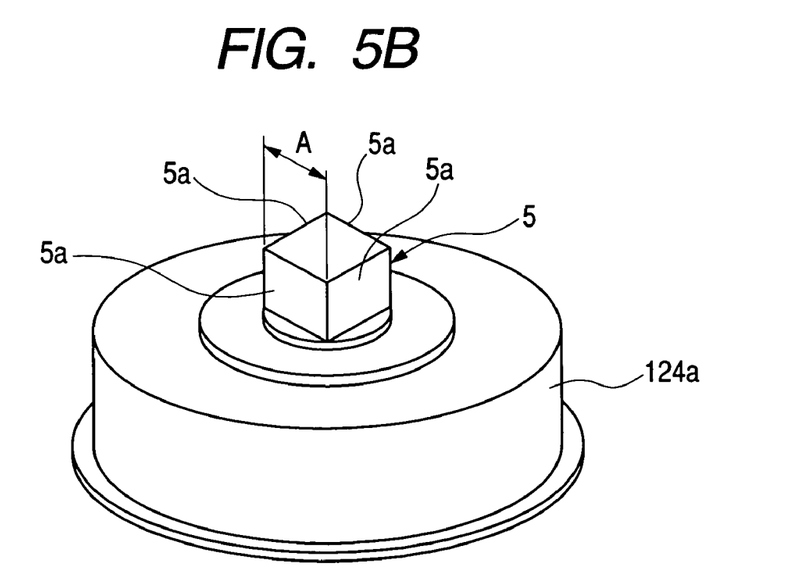
FIG. 5B is a perspective view illustrating a main portion in the vicinity of the rotary polygon mirror in the first embodiment.

In other words, since the size of the rotary polygon mirror is reduced in the first embodiment, it is possible to form facets directly on the rotational shaft, and execute a surface treatment, such as a metal plating coating, for forming a specular surface. FIG. 5A is a cross-sectional view illustrating a main portion in the vicinity of the rotary polygon mirror in the first embodiment, and FIG. 5B is a perspective view illustrating the main portion in the vicinity of the rotary polygon mirror in the first embodiment.

As illustrated in FIG. 5A, there are provided a sleeve 121 serving as a sleeve member which is held by a bearing housing 127a integral with an optical box 127, a rotational shaft 122 serving as a shaft member (a rotational portion) rotatably fit into the sleeve 121, a yoke 124a fixed to a flange member 123 integral with the rotational shaft 122 and a rotor magnet 124, and a stator coil 126 fixed to a motor substrate 125 integral with the bearing housing 127a. The rotary polygon mirror 5 is formed directly on a projecting portion of the rotational shaft 122 projecting upward above the flange member 123. As illustrated in FIG. 5B, on the projecting portion of the rotational shaft 122 projecting upward above the flange member 123, a plurality of deflecting facets (reflective facets) 5a constituting the rotary polygon mirror 5 are integrally formed by directly processing its outer surface 5a. In order to improve a reflectivity of a light beam, each deflecting facet 5a is subjected to the surface treatment (specular processing), such as the metal plating coating, for forming the specular surface.

Further, since the deflecting facet 5a can be directly formed using a center axis of the rotational shaft 122 as a reference, a relative difference in a distance between the center axis, i.e., a rotational center, of the rotational shaft 122 and each deflecting facet 5a can be drastically reduced. Since the shape precision of the deflecting facet is thus improved, the light beam reflected by each deflecting facet 5a is imaged on the photosensitive drum surface 8 as a spot with approximately the same diameter. It is accordingly possible to form an image with a high quality and a very small unevenness. Further, since the deflecting facet 5a of the rotary polygon mirror 5 is formed directly on the rotational shaft 122, it is possible to omit a fixing member, such as a hold-down spring, needed to mount the rotary polygon mirror as a separate member, and reduce the size of a flange portion of the flange member needed as a bearing surface for installing the rotary polygon mirror 5. Accordingly, the moment of inertia of the rotary member can be enormously reduced, the load of inertia of the overall rotary member can be decreased, and an increase in power consumption of the motor can be oppressed. Therefore, a rise in temperature can be reduced, and a print-out time can be shortened owing to a decrease in a rise time of the motor. Moreover, further reduction in size and cost of the apparatus can be expected.

The above-discussed rotary polygon mirror can be a very effective deflecting unit when used not only in the under-field optical system, but also in an over-field optical system described later.

Second Embodiment

Figure 6A:
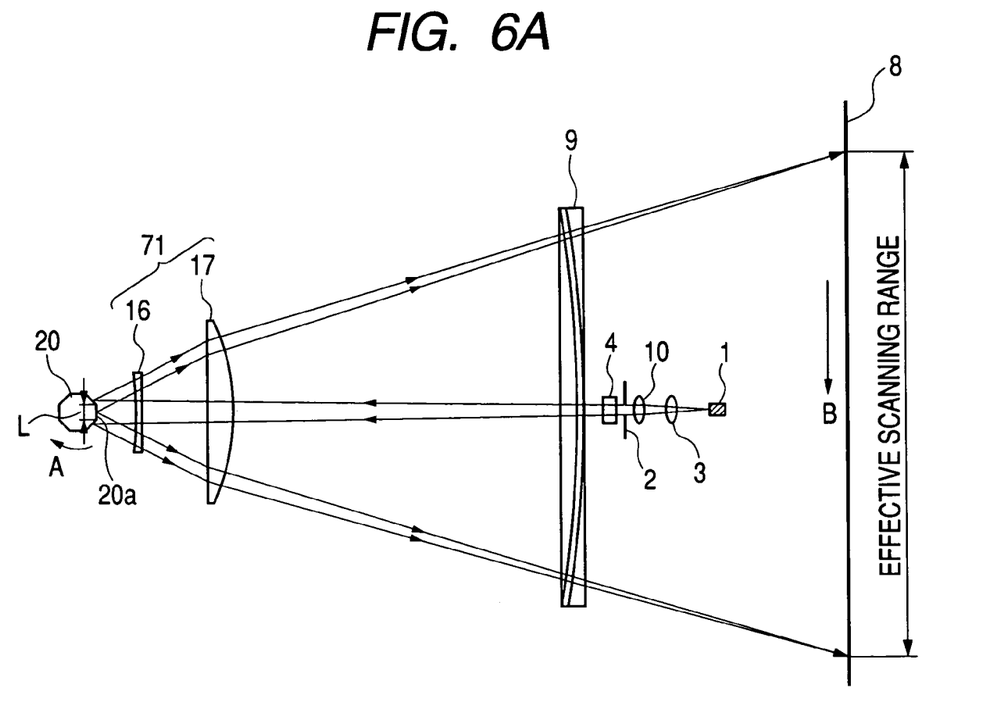
FIG. 6A is a cross-sectional view taken along a main scanning section illustrating a second embodiment according to the present invention.
Figure 6B:
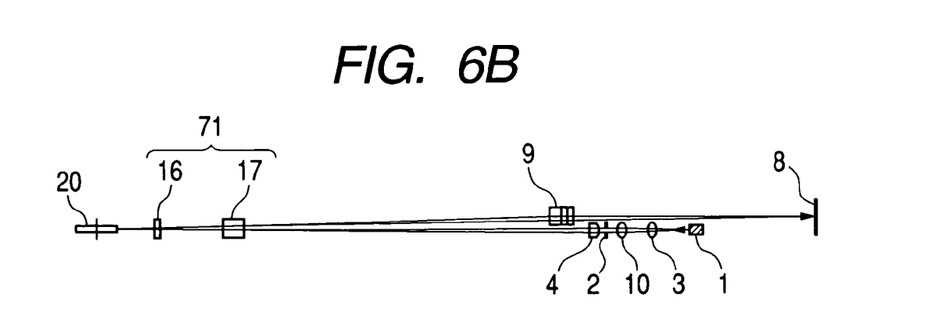
FIG. 6B is a cross-sectional view taken along a sub scanning section illustrating the second embodiment according to the present invention.

FIG. 6A is a cross-sectional view taken along the main scanning direction illustrating an optical scanning apparatus of a second embodiment according to the present invention. FIG. 6B is a cross-sectional view taken along the sub scanning section of FIG. 6A. In FIGS. 6A and 6B, like reference numerals designate the same elements as those illustrated in FIGS. 1A and 1B.

The second embodiment is different from the above-discussed first embodiment in that the optical system is comprised of an over-field optical system (an OFS optical system), and conditions (3) and (4) described later are satisfied in compliance therewith. Other structures and optical operation of the second embodiment are approximately the same as those of the first embodiment, thereby obtaining technical advantages similar to those of the first embodiment.

In the second embodiment, an optically-modulated light beam emitted from a semiconductor laser 1 serving as a light source unit is converted into a nearly parallel light beam by a first lens (a converting optical element) 3, is converted into a divergent light beam by a second lens (a converting optical element) 10, and is incident on a cylindrical lens 4 serving as an incident system after the light beam is restricted by an aperture stop 2. A light beam of the divergent light beam incident on the cylindrical lens 4 in the sub scanning section is converged, is transmitted through second and first lenses 17 and 16, and is then incident on a deflecting facet 20a of an optical deflector 20 (for example, a rotary polygon mirror). Thus, in the sub scanning section, the light beam is imaged on a place near the deflecting facet 20a as an approximately linear image (a linear image extending in the main scanning direction). Here, the light beam is obliquely incident on a rotating plane of the optical deflector 20 at a predetermined angle.

In the main scanning section, the light beam incident is transmitted through the second and first scanning lenses 17 and 16 without any change and converted into a nearly parallel light beam, and is incident on the deflecting facet 20a of the optical deflector 20 from an approximately central portion of its deflecting-angle range (frontal incidence). Here, the width of the nearly parallel light beam in the main scanning direction is set to a value that is sufficiently wider than the facet width of the deflecting facet 20a of the optical deflector 20 (the over-field system).

The light beam reflectively deflected by the deflecting facet 20a of the optical deflector 20 is guided onto a photosensitive drum surface 8 through the first and second scanning lenses 16 and 17 and an elongate lens 9 serving as an imaging system. The photosensitive drum surface 8 is scanned with the light beam in a direction of an arrow B (the main scanning direction) when the optical deflector 20 is rotated in a direction of an arrow A. Image recording is thus executed on the photosensitive drum surface 8 serving as a recording material.

The over-field optical system is suitable for a high-speed printing since the size of the rotary polygon mirror 20 can be reduced though the number of its deflecting facets is large. Further, since the number of the facets is large, a scanning angle of view is decreased and an optical path difference at the deflecting facet is accordingly reduced. The unevenness of pitches can be hence made smaller than that of the under-field system. However, since the scanning angle of view is small, the focal length of the scanning optical system increases and it is accordingly difficult to make the apparatus compact.

In the second embodiment, therefore, individual elements are set such that the size of the rotary polygon mirror can satisfy the following condition (3) using the above-described parameters for the purposes of reducing the unevenness of pitches even if the sub scanning magnification β of the scanning optical system is increased.

$$D\beta[\cos(\pi/M-|\theta|)-\sin(\pi/M-|\theta|)\tan|\theta|-\cos(\pi/M)]/\cos(\alpha/2) \leq 0.9 \text{ (mm)} \qquad (3)$$

In the above condition (3), it is preferable to set the sub scanning magnification β equal to or more than 0.8. As the sub scanning magnification β increases, the scanning lens comes closer to the rotary polygon mirror and the scanner box can be accordingly made compact. Further, the length of the lens can be decreased, so that the fabrication cost of the lens can be reduced.

The width of the light beam incident on the scanning optical system 71 is equal to a length of the deflecting facet 20a of the optical deflector 20 in the main scanning direction. When the length of the deflecting facet 20a in the main scanning section is set to L (mm), $$L = D\sin\left(\frac{\pi}{M}\right) \text{ (mm)} \qquad (d)$$

where D is the diameter of a circumscribed circle of the rotary polygon mirror, and M is the number of deflecting facets of the rotary polygon mirror. Here, when the wavelength of a light beam emitted from the light source unit is λ (mm) and the focal length of the scanning optical system in the main scanning section is f (mm), the rotary polygon mirror in the second embodiment needs only to satisfy the following condition (4)

$$\frac{D}{\lambda f}\sin\left(\frac{\pi}{M}\right) \geq 20.5 \text{ (1/mm)} \qquad (4)$$

The spot on the photosensitive drum surface is likely to be too large unless the condition (4) is satisfied, and hence the spot is unsuitable for a highly precise and fine printing. Further, a rotary polygon mirror satisfying the following condition (5) is preferable.

$$\frac{D}{f}\sin\left(\frac{\pi}{M}\right) \geq 8.2 \times 10^{-3} \qquad (5)$$

As a numerical example, an optical scanning apparatus is used, in which the focal length f in the main scanning section of the scanning optical system 71 as illustrated in FIG. 6A is 345 mm, and the rotary polygon mirror 20 has eight deflecting facets. When a circumscribed circle of the rotary polygon mirror 20 has a diameter D of 10.4 mm, the unevenness of pitches due to the deflecting-facet fall of 1' is very small, say 0.1 micron as calculated from the relation (b), since α=0 degree, θ=13 degrees, and the sub scanning magnification of the scanning optical system 71 is 0.85. When the left side of the condition (3) is calculated under the above conditions, its calculated value is 0.6 (mm) which satisfies the condition (3).

Further, in the event that a short-wavelength laser (its wavelength is 405 nm) is used, the left side of the condition (4) is calculated to be 37.2 (1/mm) which satisfies the condition (4). In a case of the over-field optical system, the size of the rotary polygon mirror can be reduced, i.e., the diameter D of its circumscribed circle can be set to about 10 mm as in the embodiment, even if the number of deflecting facets is large. Accordingly, the unevenness of pitches is small, and a higher-speed printing can be achieved.

Third Embodiment

Figure 7:
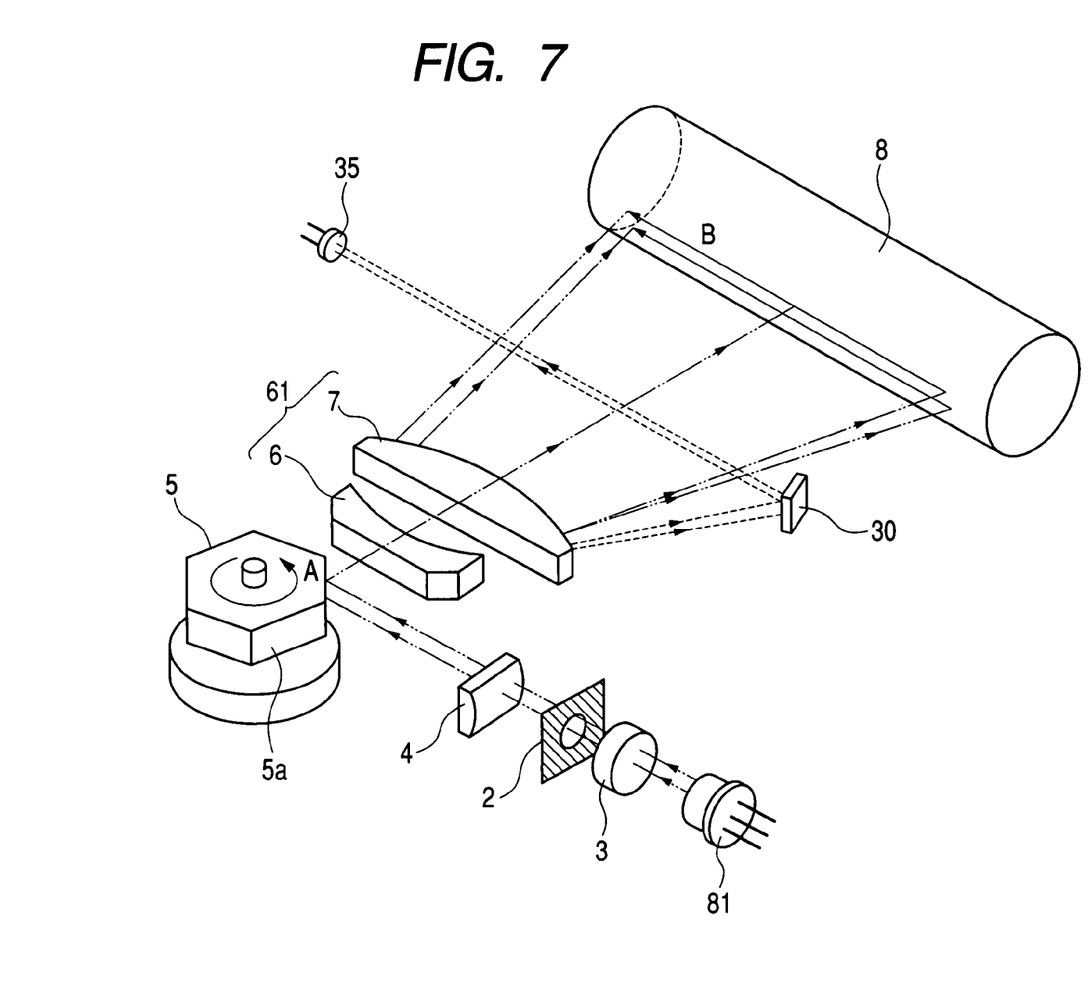
FIG. 7 is a perspective view illustrating a third embodiment according to the present invention.

FIG. 7 is a schematic view illustrating a main portion of an optical scanning apparatus (a multi-beam optical scanning apparatus) of a third embodiment according to the present invention. In FIG. 7, like reference numerals designate the same elements as those illustrated in FIGS. 1A and 1B.

The third embodiment is different from the above-discussed first embodiment in that the light source unit is comprised of a multi semiconductor laser. Other structures and optical operation of the third embodiment are approximately the same as those of the first embodiment, thereby obtaining technical advantages similar to those of the first embodiment.

In FIG. 7, reference numeral 81 designates a light source unit including a plurality of light emitting portions. The light source unit 81 is, for example, a multi semiconductor laser (a short-wavelength laser) which emits plural light beams at a wavelength equal to or less than 500 nm (in the third embodiment, 405 nm). Reference numeral 61 designates a scanning optical system (an fθ lens system) having a light condensing function and fθ characteristics, which consists of first and second fθ lenses 6 and 7 formed of a plastic material.

In the third embodiment, each divergent light beam emitted from the multi semiconductor laser 81 is converted into a convergent light beam by a converting optical element 3, each light beam is shaped into a desired beam shape by an aperture stop 2, and each shaped light beam is incident on a cylindrical lens 4. Each light beam incident on the cylindrical lens 4 emerges therefrom without any change in the main scanning section. With respect to the sub scanning section, each light beam is converged by the cylindrical lens 4, and is imaged on a deflecting facet 5a of an optical deflector 5 as an approximately linear image (a linear image extending along the main scanning direction).

Each light beam reflectively deflected by the deflecting facet 5a of the optical deflector 5 is imaged on a photosensitive drum surface 8 as a spot by first and second fθ lenses 6 and 7. The photosensitive drum surface 8 is scanned with each light beam moving in a direction of an arrow B (the main scanning direction) when the optical deflector 5 is rotated in a direction of an arrow A. Two scanning lines are simultaneously formed on the photosensitive drum surface 8 serving as a recording medium, and image information is thus recorded.

In the above-discussed optical scanning apparatus, a BD (beam detector) sensor 35 serving as an optical detector is provided such that a start timing of image formation on the photosensitive drum surface 8 can be adjusted prior to the scanning of the photosensitive drum surface 8 with the light spot. The BD sensor 35 receives a BD light beam which is a portion of the light beam reflectively deflected by the optical deflector 5, i.e., a light beam scanning a range outside an image forming range prior to the scanning of the image forming range on the photosensitive drum surface 8. The BD light beam is reflected by a BD mirror 30, and is condensed by a BD lens (not shown) to be incident on the BD sensor 35. A BD signal (a synchronous signal) is detected from an output signal of the BD sensor 35. The start timing of image recording on the photosensitive drum surface 8 is adjusted based on the BD signal.

In the third embodiment, individual elements are set such that the conditions (1) and (2) can be satisfied, as the above-discussed first embodiment, thereby achieving technical advantages similar to those of the first embodiment.

Further, in a case of the multi-beam optical scanning apparatus of the third embodiment, plural light beams are scanned on the photosensitive drum surface by a single optical scanning in the main scanning direction. Therefore, a scanning speed in the sub scanning direction by a rotation speed of the photosensitive drum can be increased without changing a scanning speed of a beam scanning unit in the main scanning direction. A high-speed image formation can be thus achieved.

In the third embodiment, the light source unit is comprised of a light source having plural light emitting portions, but the light source unit is not limited thereto. For example, the light source unit can be comprised of a plurality of light sources each of which emits a single light beam.

Further, in the first to third embodiments, the scanning optical system consists of two lenses, but the structure is not limited thereto. For example, the scanning optical system can consist of a single lens, or three or more lenses.

(Image Forming Apparatus)

Figure 8:
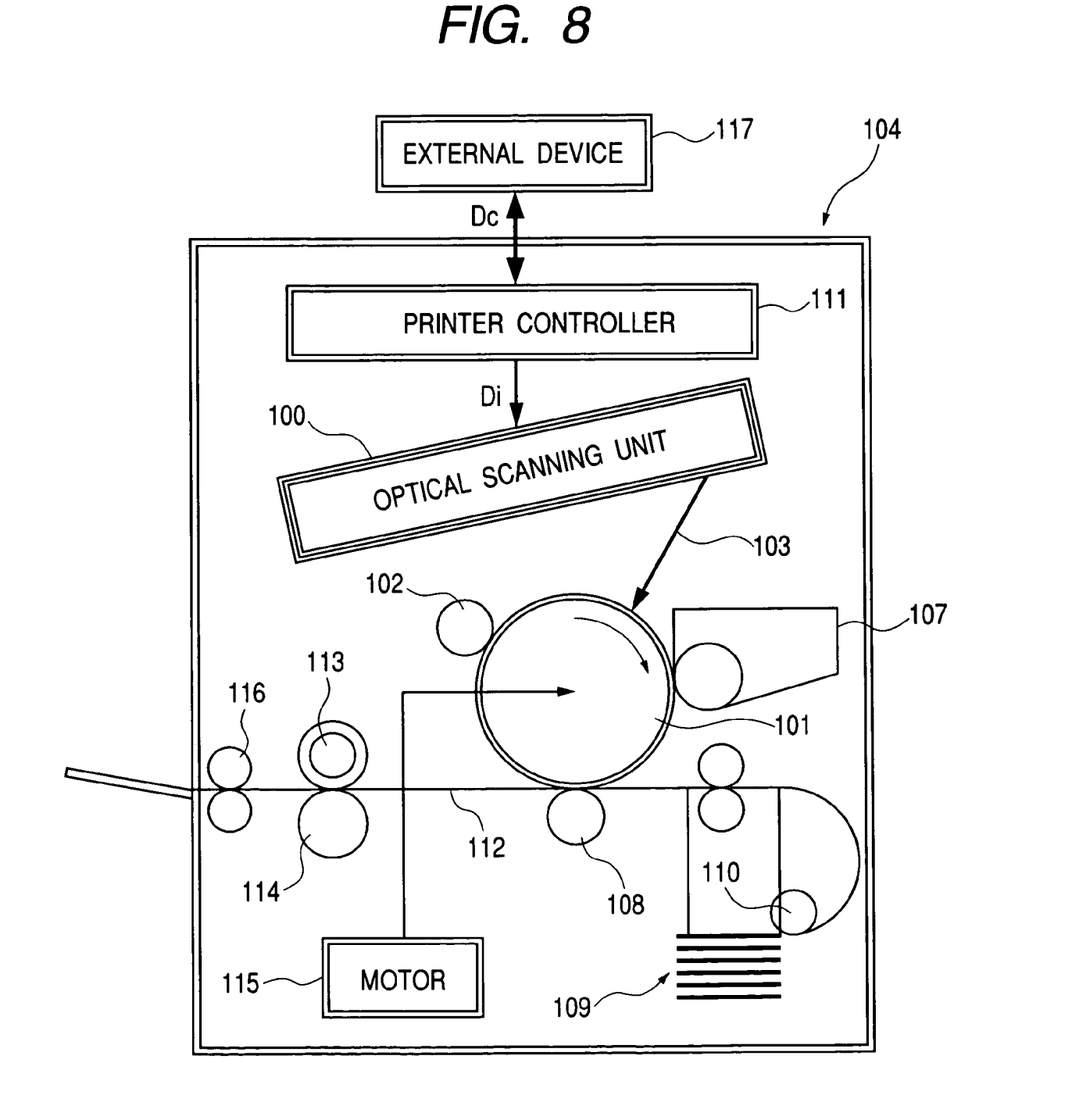
FIG. 8 is a cross-sectional view taken along a sub scanning section illustrating an embodiment of an image forming apparatus according to the present invention.

FIG. 8 is a cross-sectional view of a main portion taken along the sub scanning direction illustrating an embodiment of an image forming apparatus according to the present invention. In FIG. 8, reference numeral 104 designates an image forming apparatus. This image forming apparatus 104 accepts input of code data Dc from an external device 117, such as a personal computer or the like. This code data Dc is converted into image data (dot data) Di by a printer controller 111 in the apparatus 104. This image data Di is supplied to an optical scanning unit 100 having the structure as discussed in either of the first to third embodiments. This optical scanning unit 100 outputs a light beam 103 modulated according to the image data Di, and the light beam 103 scans a photosensitive surface of a photosensitive drum 101 in the main scanning direction.

The photosensitive drum 101 serving as an electrostatic latent image carrier (a photosensitive member) is rotated in a clockwise direction by a motor 115. With the rotation thereof, the photosensitive surface of the photosensitive drum 101 moves in the sub scanning direction perpendicular to the main scanning direction, relative to the light beam 103. Above the photosensitive drum 101, a charging roller 102 for uniformly charging the surface of the photosensitive drum 101 is disposed so as to contact the surface. And, the surface of the photosensitive drum 101 charged by the charging roller 102 is exposed to the light beam 103 scanned by the optical scanning apparatus 100.

As described previously, the light beam 103 is modulated based on the image data Di, and electrostatic latent image is formed on the surface of the photosensitive drum 101 under irradiation with the light beam 103. The electrostatic latent image is developed into a toner image by a developing unit 107 disposed so as to contact the photosensitive drum 101 downstream in the rotary direction of the photosensitive drum 101 from the irradiation position of the light beam 103.

The toner image developed by the developing unit 107 is transferred onto a sheet 112, which is a transferring material, by a transfer roller 108 disposed facing the photosensitive drum 101 below the photosensitive drum 101. Sheets 112 are stored in a sheet cassette 109 in front of the photosensitive drum 101 (on a right side of FIG. 8), but sheet feed can also be performed by hand feeding. A sheet feed roller 110 is disposed at an end of the sheet cassette 109, and feeds each sheet 112 in the sheet cassette 109 into a conveyance path.

The sheet 112, onto which the unfixed toner image is transferred as described above, is further transferred to a fixing unit located behind the photosensitive drum 101 (i.e., on a left side of FIG. 8). The fixing unit is comprised of a fixing roller 113 having a fixing heater (not shown) inside and a pressing roller 114 disposed in pressure contact with the fixing roller 113. The fixing unit heats the sheet 112 while pressing the sheet 112 thus conveyed from the transfer part, in a nip portion between the fixing roller 113 and the pressing roller 114, to fix the unfixed toner image on the sheet 112. Further, sheet discharge rollers 116 are disposed behind the fixing roller 113 to discharge the fixed sheet 112 to the outside of the image forming apparatus 104.

Although not illustrated in FIG. 8, the print controller 111 also performs control of each section in the image forming apparatus 104, including the motor 115, and control of a polygon motor, etc., in the optical scanning unit 100 described above, in addition to the conversion of data described later.

(Color Image Forming Apparatus)

Figure 9:
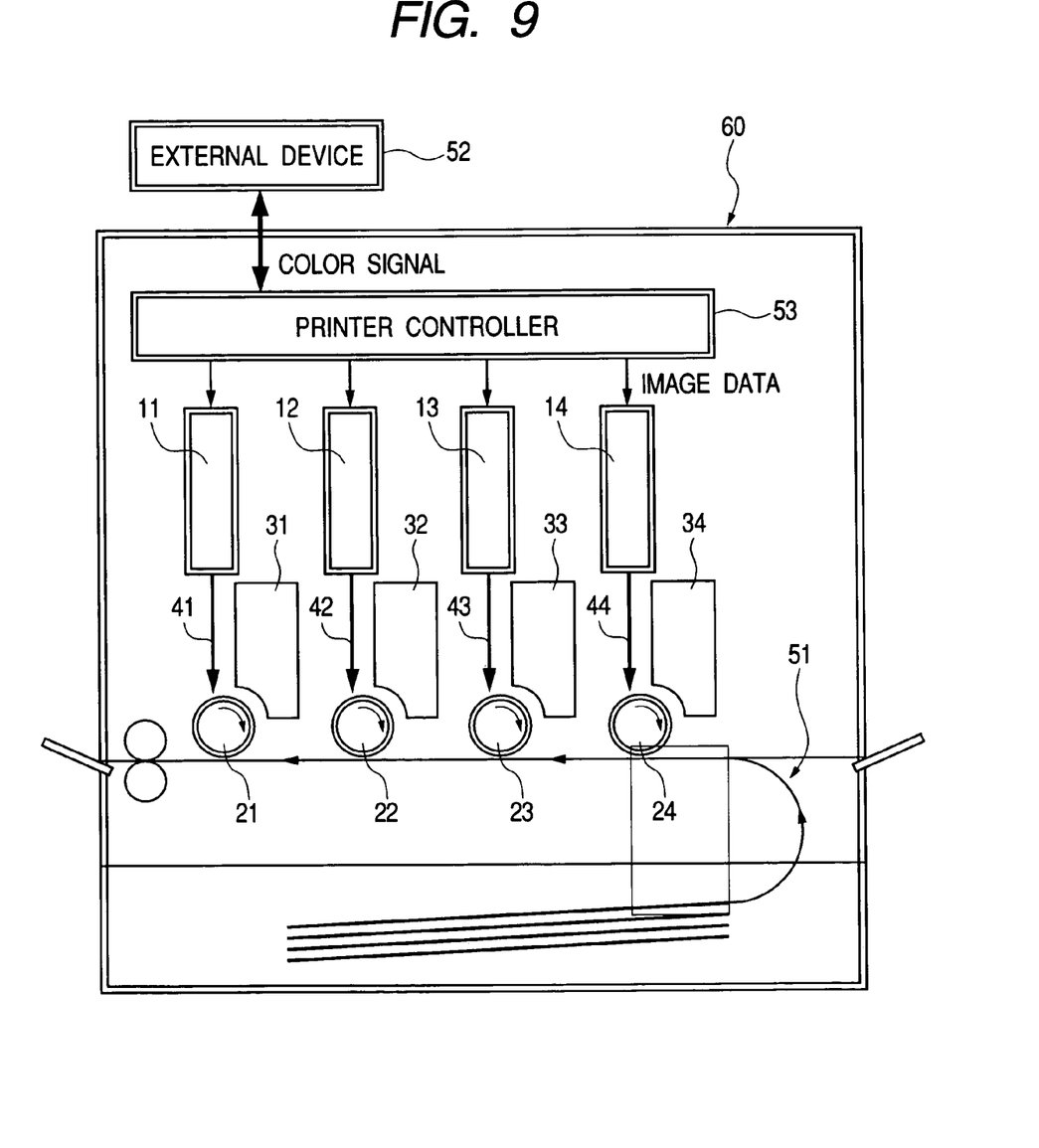
FIG. 9 is a schematic view illustrating a main portion of a color image forming apparatus according to the present invention.

FIG. 9 is a schematic view illustrating a main portion of a color image forming apparatus of the present invention. This embodiment is directed to a color image forming apparatus of a tandem type in which four optical scanning apparatuses are arranged in a parallel manner, and image information is recorded on each photosensitive drum serving as an image carrier. In FIG. 9, reference numeral 60 represents a color image forming apparatus. Reference numerals 11, 12, 13 and 14 represent optical scanning apparatuses as described in either of the above first to third embodiments of the optical scanning apparatuses, respectively. Reference numerals 21, 22, 23 and 24 represent photosensitive drums serving as image carrier, respectively. Reference numerals 31, 32, 33 and 34 represent developing units, respectively. Reference numeral 51 represents a conveyance belt.

In FIG. 9, the color image forming apparatus 60 accepts input of color signals of R (red), G (green) and B (blue) from an external device 52 such as a personal computer. Those color signals are converted into image data (dot data) of C (cyan), M (magenta), Y (yellow), and Bk (black) by a printer controller 53 in the apparatus. Each image data is supplied to each corresponding one of the optical scanning apparatuses 11, 12, 13 and 14. Each of those optical scanning apparatuses 11, 12, 13 and 14 outputs a light beam 41, 42, 43 or 44 modulated according to each image data, and these light beams scan photosensitive surfaces of photosensitive drums 21, 22, 23 and 24 in the main scanning direction, respectively.

In the color image forming apparatus of this embodiment, there are provided four optical scanning apparatuses 11, 12, 13 and 14 corresponding to colors of C (cyan), M (magenta), Y (yellow), and Bk (black), respectively, and these optical scanning apparatuses record image signals (image data) on the photosensitive drums 21, 22, 23 and 24 in a parallel manner, respectively, to speedily print a color image.

In the color image forming apparatus of this embodiment, latent images of different colors are formed on corresponding photosensitive drums 21, 22, 23 and 24 by the four optical scanning apparatuses 11, 12, 13 and 14 using the light beams based on the image data, respectively. After that, the latent images are multi-transferred onto a recording material, and a full-color picture is thus formed.

As the external device 52, a color image reading apparatus provided with a CCD sensor can be used, for example. In this case, this color image reading apparatus and the color image forming apparatus 60 constitute a color digital copying apparatus.

According to the present invention, an optical scanning apparatus, and an image forming apparatus using the image forming apparatus, which are capable of achieving the following technical advantages, can be achieved by appropriately setting individual elements such that the above-discussed conditions can be satisfied.

(1) The unevenness of pitches due to the deflecting-facet fall of the rotary polygon mirror can be reduced.

(2) The fabrication cost can be reduced due to a tolerant production standard of the rotary polygon mirror.

(3) Speed can be increased and consumption of electrical power and cost can be reduced due to the downsizing of the rotary polygon mirror.

(4) An image forming apparatus capable of forming a fine image can be obtained due to a light source unit at a short wavelength and an optimum deflecting unit.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical scanning apparatus comprising:
    a deflecting unit comprised of a rotary polygon mirror for deflecting a light beam emitted from a light source unit; and
    a scanning optical system for guiding the light beam deflected by the deflecting unit to a surface to be scanned;
    wherein a condition written as:

$$D\beta[\cos(\pi/M-|\theta|)-\sin(\pi/M-|\theta|)\tan|\theta|-\cos(\pi/M)]/\cos(\alpha/2) \leq 1.7 \text{ (mm)}$$

where D (mm) is a diameter of a circumscribed circle of the rotary polygon mirror, M is the number of deflecting facets of the rotary polygon mirror, $\alpha$ (rad) is an incident angle of the light beam on the deflecting facet at the time when the light beam scans a scanning center, $\theta$ (rad) is a maximum swing angle of the deflecting facet at the time when an effective scanning range is scanned, and $\beta$ is a magnification of the scanning optical system in a sub scanning section is satisfied.

2. An optical scanning apparatus according to claim 1, wherein where $\lambda$ (mm) is a wavelength of the light beam radiated from the light source unit, f (mm) is a focal length of the scanning optical system in a main scanning section, and f' (mm) is a focal length of a converting optical element for converting the light beam radiated from the light source unit into another light beam, an F-number of the converting optical element is equal to or larger than five (5), and a condition of $\lambda \cdot (f/f') \leq 8.1 \times 10^{-3}$ (mm) is satisfied.

3. An optical scanning apparatus comprising:
a deflecting unit comprised of a rotary polygon mirror for deflecting a light beam radiated from a light source unit; and
a scanning optical system for guiding the light beam deflected by the deflecting unit to a surface to be scanned;
wherein a width of the light beam incident on a deflecting facet of the deflecting unit is adapted to be larger than a width of the deflecting facet in a main scanning section, and a condition written as:

$$D\beta[\cos(\pi/M-|\theta|)-\sin(\pi/M-|\theta|)\tan|\theta|-\cos(\pi/M)]/\cos(\alpha/2) \leq 0.9 \text{ (mm)}$$

where D (mm) is a diameter of a circumscribed circle of the rotary polygon mirror, M is the number of deflecting facets of the rotary polygon mirror, $\alpha$ (rad) is an incident angle of the light beam on the deflecting facet at the time when the light beam scans a scanning center, $\theta$ (rad) is a maximum swing angle of the deflecting facet at the time when an effective scanning range is scanned, and $\beta$ is a magnification of the scanning optical system in a sub scanning section is satisfied.

4. An optical scanning apparatus according to claim 3, wherein a condition of $D/(\lambda f) \cdot \sin(\pi/M) \leq 20.5$ (1/mm) is satisfied where $\lambda$ (mm) is a wavelength of the light beam radiated from the light source unit, and f (mm) is a focal length of the scanning optical system in a main scanning section.

5. An optical scanning apparatus according to claim 1, further comprising a driving unit for rotatably driving the rotary polygon mirror, and a bearing portion for rotatably supporting the rotary polygon mirror, and wherein the rotary polygon mirror is comprised of a plurality of deflecting facets which are formed directly on an outer surface of a bearing member constituting a rotational portion of the bearing portion.

6. An optical scanning apparatus according to claim 3, further comprising a driving unit for rotatably driving the rotary polygon mirror, and a bearing portion for rotatably supporting the rotary polygon mirror, and wherein the rotary polygon mirror is comprised of a plurality of deflecting facets which are formed directly on an outer surface of a bearing member constituting a rotational portion of the bearing portion.

7. An optical scanning apparatus according to claim 1, further comprising a driving unit for rotatably driving the rotary polygon mirror, and a bearing portion for rotatably supporting the rotary polygon mirror, and wherein the rotary polygon mirror is comprised of a plurality of deflecting facets which are formed directly on an outer surface of a sleeve member constituting a rotational portion of the bearing portion.

8. An optical scanning apparatus according to claim 3, further comprising a driving unit for rotatably driving the rotary polygon mirror, and a bearing portion for rotatably supporting the rotary polygon mirror, and wherein the rotary polygon mirror is comprised of a plurality of deflecting facets which are formed directly on an outer surface of a sleeve member constituting a rotational portion of the bearing portion.

9. An optical scanning apparatus according to claim 1, wherein the scanning optical system is a deflecting-facet fall compensation optical system.

10. An optical scanning apparatus according to claim 3, wherein the scanning optical system is a deflecting-facet fall compensation optical system.

11. An optical scanning apparatus according to claim 1, wherein a wavelength of the light beam radiated from the light source unit is equal to or less than 500 nm.

12. An optical scanning apparatus according to claim 3, wherein a wavelength of the light beam radiated from the light source unit is equal to or less than 500 nm.

13. An optical scanning apparatus according to claim 1, wherein the light source unit includes a plurality of light emitting portions.

14. An optical scanning apparatus according to claim 3, wherein the light source unit includes a plurality of light emitting portions.

15. An image forming apparatus comprising:
an optical scanning apparatus recited in any one of claims 1 to 14;
a photosensitive member placed at the surface to be scanned;
a developing device for developing an electrostatic latent image, which is formed on the photosensitive member by the light beam scanned by the optical scanning apparatus, as a toner image;
a transferring device for transferring the developed toner image onto a transferring material; and
a fixing device for fixing the transferred toner image on the transferring material.

16. An image forming apparatus comprising:
an optical scanning apparatus recited in claim 15; and
a printer controller for converting code data input from an external device into an image signal to supply the image signal to the optical scanning apparatus.

17. A color image forming apparatus comprising:
a plurality of optical scanning apparatuses recited in any one of claims 1 to 14; and
a plurality of image bearing members each of which is placed at the surface to be scanned of the each optical scanning apparatus, and which form images of different colors, respectively.

18. A color image forming apparatus according to claim 17, further comprising a printer controller for converting color signals input from an external device into image data of different colors to supply the image data to the optical scanning apparatuses, respectively.

* * * * *